(12) United States Patent
Sarrazin et al.

(10) Patent No.: US 9,067,259 B2
(45) Date of Patent: Jun. 30, 2015

(54) METHOD FOR PRODUCING A BODY MADE FROM A GRANULAR MIXTURE

(75) Inventors: Stéphane Sarrazin, Ezanville (FR); Manuel Vargas, Pont-Sainte-Maxence (FR)

(73) Assignee: Huttenes Albertus France (FR)

( * ) Notice: Subject to any disclaimer, the term of this patent is extended or adjusted under 35 U.S.C. 154(b) by 74 days.

(21) Appl. No.: 13/386,196

(22) PCT Filed: Jul. 9, 2010

(86) PCT No.: PCT/FR2010/051457
§ 371 (c)(1),
(2), (4) Date: Jan. 20, 2012

(87) PCT Pub. No.: WO2011/010045
PCT Pub. Date: Jan. 27, 2011

(65) Prior Publication Data
US 2012/0123035 A1  May 17, 2012

(30) Foreign Application Priority Data
Jul. 24, 2009 (FR) ..................... 09 55185

(51) Int. Cl.
*C08K 5/25* (2006.01)
*B22C 1/22* (2006.01)

(52) U.S. Cl.
CPC ................. *B22C 1/2246* (2013.01); *C08K 5/25* (2013.01)

(58) Field of Classification Search
CPC ......................................................... C08K 5/25
USPC ....................................................... 524/129
See application file for complete search history.

(56) References Cited

U.S. PATENT DOCUMENTS

| | | | |
|---|---|---|---|
| 2,510,496 A | 6/1950 | Carlin | |
| 3,184,814 A | 5/1965 | Brown | |
| 3,429,848 A | 2/1969 | Robbins | |
| 4,472,165 A * | 9/1984 | Gregorian et al. | 8/115.7 |
| 4,942,217 A * | 7/1990 | Gardziella et al. | 528/129 |
| 5,112,652 A * | 5/1992 | Greene | 427/342 |
| 5,143,954 A * | 9/1992 | Hutton et al. | 524/106 |
| 5,275,648 A * | 1/1994 | Cobett et al. | 106/38.2 |
| 5,328,687 A * | 7/1994 | Leung et al. | 424/78.35 |
| 5,457,142 A * | 10/1995 | Dando et al. | 523/139 |
| 5,514,371 A * | 5/1996 | Leung et al. | 424/78.35 |
| 5,643,675 A * | 7/1997 | Ward et al. | 428/407 |
| 5,795,934 A * | 8/1998 | Parks | 525/54.3 |
| 6,572,666 B1 * | 6/2003 | Nettleship et al. | 51/298 |
| 7,770,629 B2 * | 8/2010 | Weicker et al. | 164/528 |
| 2006/0071364 A1 | 4/2006 | Zenpo et al. | |
| 2006/0141236 A1 * | 6/2006 | Nakamura et al. | 428/304.4 |
| 2006/0151575 A1 * | 7/2006 | Gienic et al. | 228/101 |
| 2007/0055041 A1 * | 3/2007 | Swedo | 528/163 |
| 2007/0149644 A1 * | 6/2007 | Stancliffe et al. | 523/144 |
| 2007/0246182 A1 * | 10/2007 | Bovens | 164/16 |
| 2008/0099180 A1 * | 5/2008 | Weicker et al. | 164/529 |
| 2009/0032210 A1 * | 2/2009 | Skerdi et al. | 164/131 |
| 2012/0123035 A1 * | 5/2012 | Sarrazin et al. | 524/192 |

FOREIGN PATENT DOCUMENTS

| | | |
|---|---|---|
| EP | 1868753 A1 | 12/2007 |
| WO | 2006/097278 A1 | 9/2006 |

OTHER PUBLICATIONS

Ralf-Joachim Gerlach. Minelco GmbH. Essen.Germany: AWB—the b nder system for a clean foundry. USEPA Meeting on Innovative Binders for the Iron and Steel Foundries Oct. 26, 2005. [Online](Oct. 26, 2005). XP002441666.

Trinowski Douglas M. Ha International. Westmont. I L: II Environmental Improvements to UCB Binders & the CORDIS Process. USEPA Meeting on Innovative Binders for the Iron and Steel Foundries. (Oct. 26, 2005). XP002586795.

International Search Report, PCT/FR2010/051457, dated Feb. 10, 2011.

* cited by examiner

*Primary Examiner* — Michael Pepitone
*Assistant Examiner* — Michael A Salvitti
(74) *Attorney, Agent, or Firm* — Lerner, David, Littenberg, Krumholz & Mentlik, LLP

(57) ABSTRACT

The invention relates to a method for producing a body including: preparing a granular mixture including a) at least 90 wt % of mineral oxide grains; b) 0.3 to 3 wt % of resin polycondensed with formaldehyde and/or the derivatives thereof, the percentage being calculated in terms of dry resin extract; c) 0.001 to 1 wt % of a hardening agent, the percentage being calculated in terms of dry hardener extract; d) 0.005 to 0.35 wt % of a formaldehyde scavenger compound; and e) 0.2 to 3 wt % of water; contacting said granular mixture with a surface of a forming tool; and insufflating a gas flow at 50 to 380 degrees into the granular mixture for 1 to 300 seconds in order to at least partially cure said mixture, the formaldehyde scavenger being carbohydrazide.

15 Claims, No Drawings

METHOD FOR PRODUCING A BODY MADE FROM A GRANULAR MIXTURE

CROSS REFERENCE TO RELATED APPLICATIONS

The present application is a national phase entry under 35 U.S.C. §371 of International Application No. PCT/FR2010/051457, filed Jul. 9, 2010, published in French, which claims priority from French Patent Application No. 0955185, filed Jul. 24, 2009, all of which are incorporated herein by reference.

The present invention relates to a method for producing a body from a granular mixture, as well as the body obtained by said method.

Methods for the hot forming of granular or fibrous substances are industrial methods leading to the production of bodies that are usually solid. Industrial methods of the "hot box" type have been carried out for a very long time using resins. In general, the resins are closely mixed with the substance(s) to be agglomerated, or spread over the surface to be bonded, in combination with a curing agent, the function of which is to acidify the reaction medium in situ.

The substances to be formed or agglomerated generally in solid form usually contain at least one granular filler such as for example mineral or synthetic sands, glass microbeads, ceramic microbeads and fibres that are usually lignocellulosic.

After incorporation of the resins and curing agents, and optionally at least one other additive, the substance to be agglomerated is generally fluid, usually viscous. The substance to be agglomerated is then placed in contact with or in a forming tool, then heated, heat generally being provided by heating the forming or shaping tooling.

The heat causes the resins to cure by polymerization, then the solid body thus formed is generally removed from the forming tool for its subsequent use. By "body" is meant according to the invention a materiel object occupying a portion of space and having particular properties. The body according to the invention is usually solid, i.e. having an invariable structure and volume. A fluid body is a body constituting a continuous deformable medium.

One of the "hot box" type industrial methods uses formaldehyde polycondensed resins. These resins are hot thermoset in an acid medium by polymerization.

In the foundry field, moulds and cores are generally solid bodies that can be produced from a granular filler by a method of the "hot box" type. When each metal part is cast, the corresponding moulds and cores are destroyed by combustion of the resin on contact with the metal. This means that a mould and core set must be produced for every part made. In order to promote this destruction and limit combustion gas pollution, the resin levels, calculated in dry solids, are extremely low, usually comprised from 0.3 to 3% by weight with respect to the mass of granular filler to be agglomerated. Moreover, the chemical nature of the combustion gasses has significance both for the quality of the cast metal parts and for workers' health.

Finally, in certain industrial fields, such as that of mass production in the car industry, moulds and cores must be produced at high rates that can reach several thousand parts per day. In this case, forming tools or core boxes are metal, since the heating temperatures required in order to obtain a rapid polymerization of the resins are high, generally greater than 150° C., and can reach 380° C. This involves significant tooling costs and especially problems of dimensional accuracy of the moulds and cores, associated with the expansion of the tools. Furthermore, the respiratory pollutants are considered unacceptable for personnel working in this environment.

For these reasons, over the last forty years or so the industry has progressively turned away from "hot box" type methods in favour of "cold box" type methods. These "cold box" methods offered the use of alternative, cold-set binders, generating a level of pollution considered lower in health and safety terms, and especially compatible with a high industrial production rate.

However today, the alternative "cold box" binders pose health and safety risks that have become less compatible with more stringent safety and environmental standards.

In this context the Applicant has discovered an improved "hot box" type method, allowing for the problems presented by the previously described "hot box" type methods to be solved and overcoming the inadequacies of "cold box" type methods, most particularly in the foundry industry.

The invention relates to a method for producing a body, said method comprising at least the following successive steps:
producing a granular mixture, comprising:
  a—at least 90% by weight, preferably 96 to 99% by weight of grains or particles, said grains being mainly composed of at least one mineral oxide, and at least 80% of said grains having a size of 10 to 3,000 µm,
  b—0.3 to 3% by weight, preferably 0.6 to 1.5% by weight of at least one resin polycondensed with formaldehyde and/or its derivatives, the percentage being calculated in dry resin solids,
  c—0.001 to 1% by weight, preferably 0.005 to 0.04% by weight of at least one curing agent, the percentage being calculated in dry curing agent solids,
  d—0.005 to 0.35% by weight, preferably 0.02 to 0.15% by weight of at least one formaldehyde scavenger compound, and
  e—0.2 to 3% by weight, preferably 0.7 to 2% by weight of water;
placing said granular mixture in contact with at least one surface of a forming tool, and
blowing at least one gas stream into the granular mixture at a temperature of 50 to 380 degrees, for a duration of 1 to 300 seconds, in order to ensure at least partial curing of said mixture,
the method being such that the formaldehyde scavenger compound is carbohydrazide.

The blowing step makes it possible to implement at least partially at least one chemical reaction allowing said mixture to cure at least partially.

As known to a person skilled in the art, these steps are generally followed by extracting a solid body from the forming tool.

Of course, the granular mixture can contain any other additive known to a person skilled in the art. In particular the granular mixture can contain any liquid or powder additive, considered useful by a person skilled in the art, for promoting the physicochemical behaviour of the mixture during its conversion and subsequent use.

The particles of the granular mixture according to the invention are generally natural or synthetic. Preferably, the particles are mineral oxide particle(s), usually natural silica sand mixtures, the particles of which mainly consist of silica oxide and the AFS grain size number of which can vary from 30 to 140.

Water is generally added to the granular mixture mainly as a support or as a solvent of the other components of said granular mixture.

Thus, in a preferred embodiment of the method according to the invention, during the formation of the granular mixture the curing agent is in the form of an aqueous solution containing generally 0.5 to 20% by weight of the curing agent, said aqueous solution preferably moreover generally containing 0.005 to 50% by weight of carbohydrazide.

Inasmuch as the curing agent is generally incorporated into the granular mixture at a very low ratio, it is better dispersed when diluted in an aqueous solution. The same applies to carbohydrazide.

The granular mixture according to the invention is generally in the form of at least one fluid aggregate.

The surface of the forming tool with which the granular mixture is in contact generally represents the "negative" of the part to be formed in the body produced according to the invention.

The step of blowing a hot gas stream is generally such that the temperature and flow of said stream are adjusted in order to cause the temperature to rise within the core of the granular mixture, substantially above the ambient temperature (which is approximately 20° C.) and preferably above 45° C.

By the presence of carbohydrazide in the granular mixture, the method according to the invention advantageously makes it possible to limit the emission of formaldehyde. The presence of carbohydrazide makes it possible to block the free formaldehyde at the end of curing, in a particularly advantageous fashion according to the invention.

Preferably, the method according to the invention is such that, moreover, the forming tool is heated to a temperature of 40 to 180° C., preferably 50 to 140° C. This is generally carried out as early as the contact step, and at the latest during the blowing step.

Thus, the heat provided by the hot gas is supplemented by the heat from heating the forming tool, so that in a preferred version of the invention, heating of the granular mixture is optimized.

The gas is preferably chosen from the group consisting of air, an inert gas and a gas contributing to the acidification of the reaction medium.

By "inert gas", is meant according to the invention a gas that does not contribute to the reaction, for example chosen from dinitrogen and the so-called noble gasses such as helium, neon and argon. By "gas contributing to the acidification of the reaction medium", is meant according to the invention a gas making it possible to reduce the pH of the medium in situ, such as carbon dioxide and sulphur dioxide.

In a preferred embodiment of the invention, the method includes an additional step, during which at least one stream of at least one gas is circulated within the at least partially cured granular mixture, at a temperature less than or equal to the ambient temperature, for example 5° C. to 25° C., for a duration of 1 to 300 seconds, the gas being preferably chosen from the group consisting of air, dinitrogen and carbon dioxide. This step is usually carried out before the possible step of removing the body from the forming tool. The gas is usually not pre-heated, and therefore substantially at ambient temperature, or even possibly cooled.

As formaldehyde pollution can occur after production of the body, during its storage or subsequent handling, it proves very beneficial and advantageous within the framework of the invention to supplement the carbohydrazide activity by blocking the resin polymerization reaction by cooling the body after its partial curing. Moreover, the gas stream advantageously allows any remaining free formaldehyde to be washed away by a stream of air, dinitrogen or carbon dioxide.

By resin or polycondensed resin or resin polycondensed with formaldehyde and/or its derivatives is meant a composition of at least one resin having undergone a chemical reaction between a first element chosen from urea and its derivatives, melamine, benzoguanamine, glycoluril, phenol or furfuryl alcohol and a second element chosen from formaldehyde and/or its derivatives, in which the chain growth generally causes the release of a water molecule at each stage.

Excess free constituent(s) of the resin can remain in the resin, or have been added to it after polycondensation.

The resin polycondensed with formaldehyde and/or its derivatives is generally such that it heat cures in an acid medium. Such a resin is commercially available.

The resin polycondensed with formaldehyde and/or its derivatives according to the invention can optionally contain at least one additive chosen from the solvents, diluents, stabilizers and solid particle fillers usually used, and known to a person skilled in the art, in order to obtain a particular effect. Thus said resin can contain at least one silane, which generally allows the bond between the resin and the particles to be bridged, and thus optimized.

The curing agent is generally chosen from the group consisting of the following compounds:
  naturally acid salts such as ammonium salts, in particular ammonium persulphates, nitrates, bisulphates, sulphates and chlorides; and
  salts generating an acid by reaction with an aldehyde such as hydroxylamine salts, in particular hydroxylamine sulphates, hydrochlorides, phosphates, sulphonates and nitrates.

The curing agent is more generally such that it renders the reaction medium of the mixture acidic either by its innate acidity, or by its capacity to release acid during the polymerization process.

Particularly preferably, the curing agent is chosen from the group consisting of hydroxylamine salts. The hydroxylamine salts advantageously release an acid in the presence of formaldehyde.

In this case, it appears surprisingly according to the invention that the available free formaldehyde combines as a priority with the hydroxylamine salts to release an acid, and that carbohydrazide only inhibits the formation of acid by said salts to a minor extent, or not at all, during the curing reaction.

Moreover, the addition of carbohydrazide substantially improves the mechanical characteristics of the parts obtained by the method according to the invention.

Moreover, the Applicant has found that the use of hydroxylamine salts significantly and advantageously improves the method according to the invention, by accelerating the kinetics of curing and by increasing the acidity of the reaction medium as the curing reaction releases formaldehyde.

A person skilled in the art is able to choose the appropriate resin and curing agent for the case in hand, taking into account in particular the reactivity of the binder system, i.e. the resin(s) and curing agent(s) incorporated in the granular mixture. In standard fashion, with the usual mixing equipment available, a person skilled in the art first places the granular portion(s) in a mixer, followed by the liquid portion(s), the mixing time depending on the equipment, and preferably from 15 s to 5 min.

Of course, the method according to the invention can be used most particularly in a method for the production of a metal casting, which comprises pouring a liquid metal into at least one mould and/or core, characterized in that said mould and/or core is a body obtained by the method according to the invention as previously described.

Preferably, a method of this type for the production of a metal casting is such that the metal is chosen from the group consisting of aluminium, non-ferrous metals and non-ferrous alloys.

This method for the production of a metal casting makes it possible to obtain any cast metal part by such a production method, as well as any mechanical assembly including at least one such part.

The invention will be better understood in the light of the following examples which illustrate the invention non-limitatively.

EXAMPLES

The examples were produced each time by mixing 4 kg of SIFRACO LA 32 silica sand with the binders in the proportions indicated for each granular mixture.

The granular mixture was made in a mixer with a vibrating bowl using a mixing time of 60". The granular mixture was then blown into a box equipped with a heating system and a hot air intake, containing two test samples for measuring standardized mechanical characteristics having a 1" square cross-section, on a ROPER machine.

The curing was carried out according to the data given for each granular mixture.

The formaldehyde was measured using a DRAEGER pump equipped with "formaldehyde" tubes 0.2/a or 2/a, according to the concentration to be measured. The measurement ranges are 0.2 to 5 ppm for tube 0.2A and 2 to 40 ppm for tube 2A.

This measurement was carried out for each granular mixture, on the one hand above the vibrating bowl of the mixer, and on the other hand above the core box on removal of the test pieces after curing.

All incorporation rates are percentages by weight.

The bending measurements were carried out according to the B.N.I.F. technical recommendations n° 481 and 487 of December 1999 published by and available from the Centre Technique des Industries de la Fonderie in Sèvres, France and the results are expressed in daN/cm².

It is considered that bending strengths of approximately 10 daN/cm² on removal are sufficient to allow handling of the formed bodies, and that strengths of approximately 30 daN/cm² after one hour are often satisfactory to allow the metal to be cast.

The resin CLEANTECH 11R26 was a urea/formaldehyde polycondensed resin in an acid medium marketed by the company HUTTENES-ALBERTUS.

The resin Resital 12B62 was a phenol-formaldehyde resin marketed by HUTTENES-ALBERTUS.

The curing agent CLEANTECH 14D38 was an aqueous solution containing 3% hydroxylamine sulphate and 15% carbohydrazide marketed by HUTTENES-ALBERTUS.

The curing agent CLEANTECH 14D68 was an aqueous solution containing 3% hydroxylamine sulphate marketed by HUTTENES-ALBERTUS.

The curing agent Harter AT3B used is marketed by HUTTENES-ALBERTUS. This is an aqueous solution of acid salts based on ammonium nitrates, urea and lignosulphonates.

The dry solids expressed in % by weight are the residual product after heating one gram of product at 135° C. for one hour.

The test pieces obtained are solid formed bodies that can be likened to cores.

Example 1

Comparative

Resin: CLEANTECH 11R26 at 1.5% i.e. 0.81% dry solids.
Curing agent: CLEANTECH 14D68 at 0.4% i.e. 0.012% dry solids
Box Temperature: 100° C.
Hot Air Temperature: 150° C.
Duration of curing in box: 120"
Bending Strength on removal from box: 21
Bending strength 1 hour later: 40
Formaldehyde on mixing: less than 0.2 ppm (undetectable)
Formaldehyde on removal: 0.5 ppm.

The bodies formed according to the method of Example 1, with a low resin ratio and a relatively long curing time, have mechanical characteristics sufficient to envisage producing formed bodies in an industrial context. However, the high level of formaldehyde poses problems on removal (or extraction).

Example 2

Comparative

Resin: CLEANTECH 11R26 at 2% i.e. 1.09% dry solids
Curing agent: CLEANTECH 14D68 at 0.4% i.e. 0.012% dry solids
Box Temperature: 100° C.
Hot Air Temperature: 150° C.
Duration of curing in box: 30"
Bending Strength on removal from box: 10
Bending strength 1 hour later: 32
Formaldehyde on mixing: less than 0.2 ppm (undetectable)
Formaldehyde on removal: 0.5 ppm The bodies formed according to the method of Example 2, with a medium resin ratio and a relatively short curing time, have mechanical characteristics sufficient to envisage producing formed bodies in an industrial context. However, the high level of formaldehyde poses problems on removal (or extraction).

Example 3

According to the Invention

Resin: CLEANTECH 11R26 at 2% i.e. 1.09% dry solids
Curing agent: CLEANTECH 14D38 at 0.4% i.e. 0.072% dry solids
Box Temperature: 100° C.
Hot Air Temperature: 150° C.
Duration of curing in box: 30"
Bending Strength on removal from box: 14
Bending strength 1 hour later: 56
Formaldehyde on mixing: less than 0.2 ppm (undetectable)
Formaldehyde on removal: less than 0.2 ppm (undetectable)

The bodies formed according to the method of Example 1, with a medium resin ratio and a relatively short curing time, have mechanical characteristics sufficient to envisage producing formed bodies in an industrial context. The formaldehyde levels are below the detection threshold.

Example 4

According to the Invention

Resin: CLEANTECH 11R26 at 2% i.e. 1.09% dry solids
Curing agent: CLEANTECH 14D38 at 0.4% i.e. 0.072% dry solids
Box Temperature: 100° C.
Hot Air Temperature: 150° C.
Duration of curing in box: 120"
Bending Strength on removal from box: 50
Bending strength 1 hour later: 86
Formaldehyde on mixing: less than 0.2 ppm (undetectable)
Formaldehyde on removal: less than 0.2 ppm (undetectable)

With respect to Example 3, the curing time was increased, substantially improving the mechanical characteristics of the formed bodies, while having no effect on the absence of pollution due to formaldehyde.

Example 5

Comparative

Resin: Resital 12B62 at 2% i.e. 1.28% dry solids
Curing agent: Harter AT3B at 0.5% i.e. 0.31% dry solids
Box Temperature: 220° C.
Hot Air Temperature: gas not supplied
Duration of curing in box: 120"
Bending Strength on removal from box: 56
Bending strength 1 hour later: 78
Formaldehyde on mixing: 1 ppm
Formaldehyde on removal: 20 ppm The usual "hot box" method with the settings habitually used by a person skilled in the art generates formaldehyde emissions that are incompatible with the current health and safety standards.

Example 6

Comparative

Resin: Resital 12B62 at 2% i.e. 1.28% dry solids
Curing agent: Harter AT3B at 0.5% i.e. 0.31% dry solids
Box Temperature: 100° C.
Hot Air Temperature: gas not supplied
Duration of curing in box: 30"
Bending Strength on removal from box: 1
Bending strength 1 hour later: 23
Formaldehyde on mixing: 1 ppm
Formaldehyde on removal: 1 ppm With respect to Example 5, the temperature of the box was reduced. The usual "hot box" method with the box temperature settings according to the invention does not make it possible to achieve the bending strengths on removal from the box that are necessary for the extraction of the formed body. Moreover, the formaldehyde emissions are incompatible with current health and safety standards.

The invention claimed is:

1. A method for producing a body, said method comprising at least the following successive steps:
    preparing a granular mixture, comprising:
        a—at least 90% by weight of particles, said particles being mainly composed of at least one mineral oxide, and at least 80% of said grains having a size of 10 to 3000 μm,
        b—0.3 to 3% by weight of at least one resin polycondensed with formaldehyde and/or its derivatives, the percentage being calculated in dry resin solids, wherein the at least one resin is a composition of at least one resin having undergone a chemical reaction between a first element chosen from urea and its derivatives, melamine, benzoguanamine, glycoluril and a second element selected from the group consisting of formaldehyde and its derivatives,
        c—0.001 to 1% by weight of at least one curing agent, the percentage being calculated in dry curing agent solids,
        d—0.005 to 0.35% by weight of at least one formaldehyde scavenger compound, and
        e—0.2 to 3% by weight of water;
    placing said granular mixture in contact with at least one surface of a forming tool, and
    blowing at least one gas stream into the granular mixture, the at least one gas stream having a temperature of 50 to 380 degrees Celsius, for a duration of 1 to 300 seconds, to ensure at least partial curing of said mixture,
    the method being such that the formaldehyde scavenger compound is carbohydrazide, and
    wherein, during the step of at least partial curing of said mixture, the formaldehyde reacts as a priority with the curing agent.

2. The method according to claim 1, such that the curing agent, during the formation of the granular mixture, is in the form of an aqueous solution, containing 0.5 to 20% by weight of the curing agent.

3. The method according to claim 1, such that the forming tool is heated to a temperature of 40 to 180° C.

4. The method according to claim 1, such that said gas is selected from the group consisting of air, an inert gas and a gas contributing to the acidification of the reaction medium.

5. The method according to claim 1, including an additional step, during which a stream of at least one gas is circulated within the at least partially cured granular mixture, at a temperature less than or equal to the ambient temperature, for a duration of 1 to 300 seconds, the gas is selected from the group consisting of air, dinitrogen and carbon dioxide.

6. The method according to claim 1, in which the curing agent is selected from the group consisting of the following compounds:
    naturally acid salts such as ammonium salts, in particular ammonium persulphates, nitrates, bisulphates, sulphates and chlorides; and
    salts generating an acid by reaction with an aldehyde such as hydroxylamine salts, in particular hydroxylamine sulphates, hydrochlorides, phosphates, sulphonates and nitrates.

7. The method according to claim 1, wherein the granular mixture comprises between 96 to 99% by weight of said particles.

8. The method according to claim 1, wherein the granular mixture comprises between 0.6 to 1.5% by weight of the at least one resin polycondensed with formaldehyde and/or its derivatives, the percentage being calculated in dry resin solids.

9. The method according to claim 1, wherein the granular mixture comprises between 0.005 to 0.04% by weight of the at least one curing agent, the percentage being calculated in dry curing agent solids.

10. The method according to claim 1, wherein the granular mixture comprises between 0.02 to 0.15% by weight of the at least one formaldehyde scavenger compound.

11. The method according to claim 1, wherein the granular mixture comprises between 0.7 to 2% by weight of said water.

12. The method according to claim 2, wherein said aqueous solution also contains 0.005 to 50% by weight of carbohydrazide.

13. The method according to claim 3, wherein the forming tool is heated to a temperature of 50 to 140° C.

14. The method according to claim 6, wherein the curing agent is selected from the group consisting of hydroxylamine salts.

15. The method according to claim 1, wherein the reaction between the formaldehyde and the curing agent, during the step of at least partial curing of said mixture, releases an acid, and the carbohydrazide inhibits the formation of said acid at most to a minor extent.

\* \* \* \* \*